(12) United States Patent
Tao et al.

(10) Patent No.: US 8,605,988 B2
(45) Date of Patent: Dec. 10, 2013

(54) IMAGE REGISTRATION SYSTEM AND METHOD

(75) Inventors: Xiaodong Tao, Niskayuna, NY (US); James Vradenburg Miller, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1755 days.

(21) Appl. No.: 11/959,703

(22) Filed: Dec. 19, 2007

(65) Prior Publication Data

US 2009/0161931 A1    Jun. 25, 2009

(51) Int. Cl.
*G06K 9/00*    (2006.01)

(52) U.S. Cl.
USPC ............ 382/154; 382/129; 382/173; 382/276

(58) Field of Classification Search
None
See application file for complete search history.

(56) References Cited

U.S. PATENT DOCUMENTS

| 7,505,617 | B2 | 3/2009 | Fu et al. | |
| 7,756,563 | B2 | 7/2010 | Higgins et al. | |
| 2006/0072821 | A1* | 4/2006 | Wang | 382/173 |
| 2006/0210131 | A1* | 9/2006 | Wheeler et al. | 382/128 |
| 2007/0127845 | A1 | 6/2007 | Fu et al. | |
| 2009/0161931 | A1 | 6/2009 | Tao et al. | |

OTHER PUBLICATIONS

Prince, "Tomographic Reconstruction of 3-D Vector Fields Using Inner Product Probes", IEEE Transactions on Image Processing, vol. 3, No. 2, pp. 216-219, Mar. 1994.

Zeng et al., "Respiratory Motion Estimation From Slowly Rotating X-ray Projections: Theory and Simulation", Medical Physics, vol. 32, Issue 4, pp. 984-991, Apr. 2005.

* cited by examiner

*Primary Examiner* — Chan S Park
*Assistant Examiner* — Elisa Rice
(74) *Attorney, Agent, or Firm* — Jenifer Haeckl

(57) ABSTRACT

A method and system for registering two images is described. The method comprises synthesizing projections from two volumetric images to be registered, estimating a plurality of two dimensional (2D) deformable fields from the projections and generating a three dimensional (3D) deformable fields using a plurality of backprojections of the 2D deformable fields.

18 Claims, 3 Drawing Sheets

IMAGE REGISTRATION SYSTEM AND METHOD

BACKGROUND

The invention relates generally to imaging systems and more particularly to an image registration system and method adapted for use in medical imaging systems.

Typically imaging systems such as X-ray systems, computed tomography (CT) systems, positron emission tomography (PET) systems and the like are used to acquire images of various parts of a subject. The images generated by the imaging system are analyzed using imaging algorithms and pathologies of concern are highlighted which are then reviewed by radiologists for final diagnosis. In order to facilitate accurate diagnosis, it is usually important to generate high quality images with minimum image degradation.

There are several reasons for degradation in images generated by such imaging systems. Such degradation is usually related to the portion of the anatomy that is being imaged. For example, respiratory motion during image acquisition is one major source of degradation of positron emission tomography (PET) and computed tomography (CT) images of the thorax and the upper abdomen.

As a result of such motion blurring, feature location such as tumors, volume, and its contrast with surrounding tissue is often inaccurately estimated. Such inaccurate estimation often leads to incorrect tumor localization, staging, radiation therapy planning, and treatment monitoring.

One method that is often employed to limit motion blurring is active breath control. However, performing active breath control may become very uncomfortable and almost impossible for patients with serious illness. Another technique known as the gated PET/CT technique allows for estimation of respiratory motion from gated CT acquisitions and then used for motion compensation during PET image reconstruction. Typically, motion estimation is performed using spline-based transformations, demons algorithm and other optical flow based algorithms. However, such techniques are time consuming and often require additional circuitry, which in turn increases the overall cost of the system.

Therefore, what is needed is a simple, fast and accurate method and system for estimating motion from gated CT acquisition for use in PET image reconstruction.

BRIEF DESCRIPTION

Briefly according to one aspect of the invention, a method for registering two three-dimensional (3D) volumes is provided. The method comprises projecting the two 3D volumes in a plurality of two-dimensional (2D) spaces, estimating a plurality of two dimensional (2D) deformable fields for a corresponding 2D space, backprojecting the 2D deformation fields in a 3D space and updating a three dimensional (3D) deformable field.

In another embodiment, an imaging system for registering two three-dimensional (3D) volumes is provided. The system comprises a processor configured to implement an imaging algorithm. The imaging algorithm is configured to project the two 3D volumes in a plurality of two-dimensional (2D) spaces, estimate a plurality of two dimensional (2D) deformable fields for a corresponding 2D space, backproject the 2D deformation fields in a 3D space and update a three dimensional (3D) deformable field.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The described embodiments are generally directed towards an imaging system, which may be used in clinical applications. Such system may include, without limitation, positron emission tomography (PET) systems, computed tomography (CT) systems, a single photon emission computed tomography (SPECT) system, magnetic resonance imaging (MRI) systems, digital radiography image, microscopy imagery systems, single photon emission computed tomography (SPECT) systems and so forth, and generally provide useful two-dimensional and three-dimensional images. To facilitate explanation, however, PET/CT system implementations will be generally discussed herein, though it is to be understood that other implementations are also within the scope of the present invention.

Figure 1:
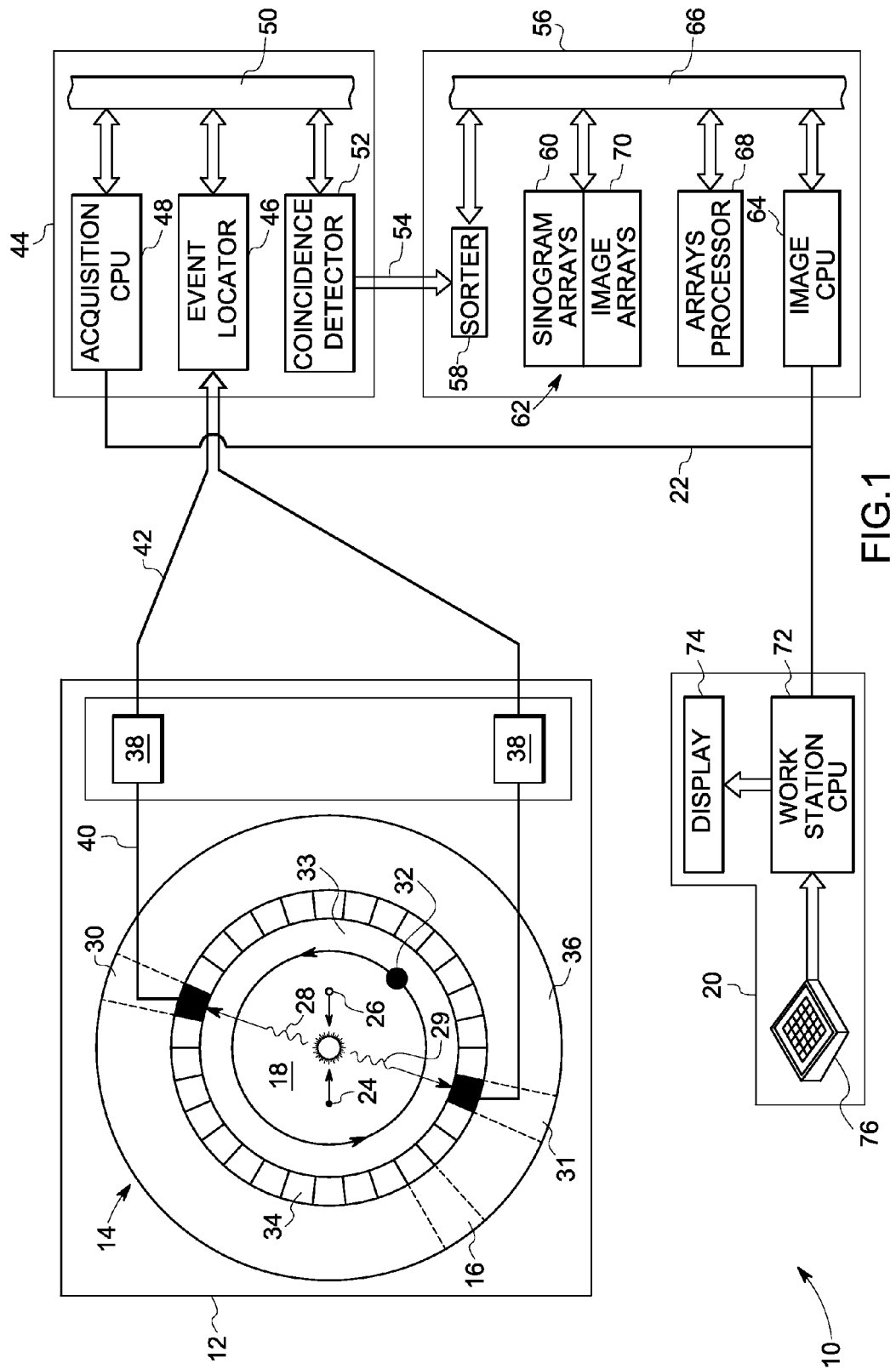
FIG. 1 is an exemplary PET imaging system for volumetric imaging using an image processor in which aspects of the present technique may be practiced.

Referring now to FIG. 1, an imaging system 10 is illustrated for acquiring and processing image data. In the illustrated embodiment, the imaging system 10 is a PET system designed both to acquire original image data and to process the image data for display and analysis in accordance with the present technique. The PET imaging system 10 is illustrated with a gantry 12 that supports a cylindrical detector ring assembly 14, comprising of an array of detectors 16 (detector units), about a central aperture (imaging volume) 18. The detectors 16 may be shielded from radiation from outside the filed of view by lead end-shields. The detector ring assembly 14 generally forms a complete ring about the imaging volume 18.

A patient table may be positioned within the aperture 18 of the PET system 10. The patient table is adapted so that a patient may recline comfortably during the examination process. A patient table controller (not shown) moves the patient table into the imaging volume 18 in response to commands received from an operator workstation 20 through a communication link 22 such as a local area network (LAN). Additionally, a gantry controller (not shown) may be configured to receive commands from the operator workstation 20 through the communication link 22 to operate the gantry 12.

The patient is commonly injected with a biologically active radioactive tracer. This radioactive substance has two parts called a carrier such as glucose, which concentrates in parts of the body with increased metabolic activity, and the radionuclide, which emits a positron 24. Since positron 24 emitting isotopes of carbon, nitrogen, oxygen, and fluorine can be created and these atoms occur naturally in many compounds of biological interest, these radionuclides can therefore be readily incorporated into a wide variety of useful radio-pharmaceuticals. The type of tracer a patient receives depends on which area of the body is to be viewed. The most commonly used tracers are radiolabeled glucose, ammonia, and water, all of which are found in the human body. As the tracers are short-lived, the radiation exposure a patient receives is small. The tracer is allowed to dwell in the patient for a time such that its distribution is determined by the biological function to be imaged.

The radioactive decay of the tracer emits a positron 24 that annihilates with electrons 26 in the body of the patient. This annihilation produces two high energy (about 511 KeV) photons 28, 29 propagating in nearly opposite directions (about 180 degrees apart) that are in coincidence. These photons 28, 29 are detected by the detector ring assembly 14 surrounding the patient. When a detector 30 detects a photon 28 from an annihilation event, the detector 31 opposite it looks for a matching photon 29; and if two matching photons 28, 29 are recorded within nanoseconds of each other i.e. within a short timing window (also referred to as a coincidence timing window), the detectors 30, 31 register a coincidence event (called a true coincidence if neither photon 28, 29 is scattered) along the line connecting the two detectors 30, 31 also known as a line of response.

The PET system 10 may then draw lines of responses between each detector pair such as those indicated by reference numeral 30 and 31 registering a coincidence event during a scan. Summing many such events results in quantities that approximate line integrals through the radioisotope distribution. The higher the number of coincidences detected, the more precise this calculation will be. The PET system 10 then uses this information to construct an image of the radioisotope distribution, using algorithms similar to those applied in CT, MR and nuclear medicine, thereby yielding quantitative estimates of the concentration of the radiopharmaceuticals at specific locations within the body. The reconstructed images are cross-sectional slices that highlight areas of biochemical activity. While other diagnostic tests, such as x-rays, CT scans, MR scans or ultrasound, provide cross-sectional images of the body structure showing bones, tissue and organs, the PET scan can provide images of physiological activity giving information on the chemistry and function of the area under examination.

As illustrated in FIG. 1, each detector ring of the detector ring assembly 14 may comprise of a rod source 32 used for attenuation correction, a septa 33 used for scatter reduction, and a plurality of detector units 16 consisting of scintillator elements 34 and photomultiplier tubes 36 (PMTs). A plurality of acquisition circuits 38 may receive analog signals 40 from the detector units 16 and produce digital signals 42 indicating the event coordinates and the total energy. Each acquisition circuit 38 may also produce an event detection pulse, which indicates the moment the scintillation event took place. The digital signals 42 from the acquisition circuits 38 are then processed by a data acquisition system 44 (DAS).

The data acquisition system 44 may include an event locator 46 that periodically samples the digital signals 42 produced by the acquisition circuits 38. The data acquisition system 44 also includes an acquisition processor 48 that controls the communication link 22 and a data bus 50 (backplane bus). The event locator 46 may assemble the information regarding each valid event into an event data packet that indicates when the event took place and the position of the detector 16 that detected the event. This event data pack is conveyed to a coincidence detector 52, which may be a part of the data acquisition system 44.

The coincidence detector 52 may receive the event data packets from the event locators 46 and determine if any two of them are in coincidence. Coincidence is determined by a number of factors. First, the time markers in each event data packets may be within a specified time window of each other.

Second, the locations indicated by the two event data packets may lie between a pair of detectors, such as those indicated by reference numeral 30 and 31, which may have a line of response that passes through the field of view in the imaging volume 18. Events that cannot be paired as such are discarded, but coincident event pairs are located and recorded as a coincidence data packet that is conveyed through a serial link 54 to an image reconstructor 56.

The image reconstructor 56 may include a sorter 58 that counts events occurring along each projection ray and organizes them into a two-dimensional sinogram array 60 that may be stored in a memory module 62. The image reconstructor 56 also includes an image processor 64.

The image processor is configured implement an imaging algorithm for generating an image of a moving volume by estimating the motion and compensating for the estimated motion in the reconstructed image. The algorithm estimates motion on a projection plane and then backprojects 2D motion vectors into the native 3D space to compose a complete 3-D motion field.

The image processor also controls a data bus 66 and links the image reconstructor 56 to the communication link 22. An array processor 68 also connects to the data bus 66 and it may reconstruct images from the sinogram arrays 60. A resulting image array 70 may be stored in the memory module 62 and output by the processor 64 to the operator workstation 20.

The operator workstation 20 may include a workstation processor 72, a display unit 74 and an input device 76. The PET image may be displayed on the display unit 74 where the operator or a user such as a radiologist examines the image for further diagnosis.

The workstation processor 72 may connect to the communication link 22. The operator may control the calibration of the PET scanner 10, its configuration, positioning of the patient table for a scan and the gantry 12 through operator workstation 20. The operator may also control the display of the resulting image on the display unit 74 and perform image enhancement functions using programs executed by the workstation processor 72. It should be noted that the operator workstation 20 may be coupled to other output devices such as printers, standard or special purpose computer monitors, associated processing circuitry or the like. One or more operator workstations 20 may be further linked in the imaging system 10 for outputting system parameters, requesting examinations, viewing images, and so forth.

In the illustrated example, the PET system is used for imaging a thoracic region of a patient. Since the thoracic region is subjected to respiratory motion, the thoracic region is an example of a moving volume. The PET system is configured to generate accurate images by motion estimation and compensation. The manner in which motion estimation and compensation is achieved is described in further detail below.

Figure 2:
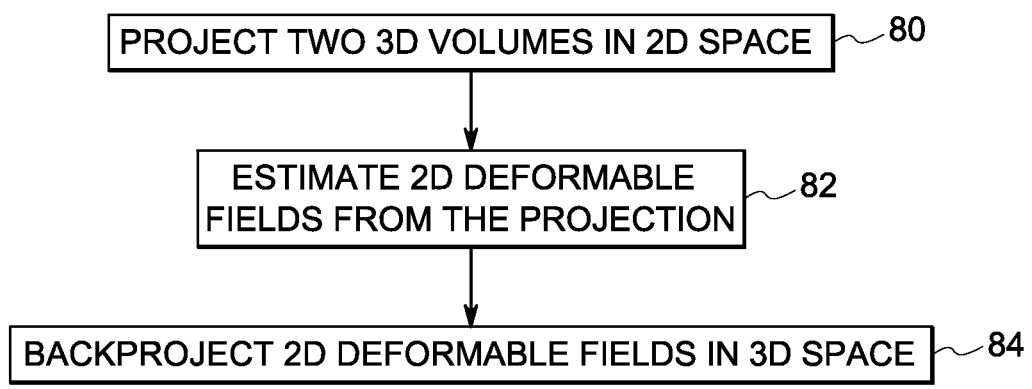
FIG. 2 is a flow chart illustrating a method for motion estimation in a positron emission tomography (PET) image implemented according to one aspect of the invention.

FIG. 2 is a flow chart illustrating a method for motion estimation in a positron emission tomography (PET) image implemented according to one aspect of the invention. The technique described herein can be used for two-dimensional, three-dimensional and four-dimensional images. The method is described using three-dimensional volumes by way of example only. Each step of the flow chart is described in further detail below.

In step 80, two three-dimensional volumes are projected in a plurality of two-dimension space. In one embodiment, the two 3D volumes are representative of a moving volume. As used herein, a moving volume is defined as a volume that is being subjected to motion during the time of imaging. In a specific embodiment, a first image of the volumetric image is acquired at a first time and a second image of the same volumetric image is acquired at a second time.

In step 82, a plurality of two-dimensional (2D) deformable fields is estimated from the projections to register the two 3D volumes in a corresponding 2D space. The 2D deformable fields can be estimated by applying a 2D deformable registration algorithm. In one embodiment, the 2D deformable fields are estimated in a plane orthogonal to the projection directions.

In step 84, the two dimensional deformable fields are backprojected in a three-dimensional space to update a plurality three-dimensional (3D) deformable fields. The 3D deformable fields include composition of backprojections of the 2D deformable fields in a plurality of projection directions. The number of projection directions is based upon a complexity of the moving volume and/or an amount of motion in the moving volume. In a specific embodiment, the 3D deformable field between the first image and the second image is generated and the first image and the second image are aligned to compensate for the displacement in the first image and second image due to motion. The manner in which motion is estimated compensated is described below with an example.

For exemplary purposes only, a fixed three-dimensional image is defined by $I_F(x)$ and a moving three-dimensional image is defined by $I_M(x)$. According to the present technique, both images are first generated in direction 'ω' to generate two-dimensional projection images $P_F(r, \omega)$ and $P_M(r, \omega)$, where 'r' $\in R^2$. In one embodiment, projections are obtained using line integrals. However, other projection techniques such as maximum intensity projection or median intensity projection can also be used. For a given image, the projection in direction 'ω' is defined as:

$$P(r, \omega) = \int_{-\infty}^{+\infty} I(r_{3D} + t\omega) dt$$

A two-dimensional registration algorithm is applied to generate a 2D transform 'T' in the projection space. In one embodiment, a free form deformable registration algorithm based on B-Spline is used. The 2D transform is represented as follows:

$$\varepsilon(T_{2D}^{(\omega)}) = \int_{R^2} [P_F(r, \omega) - P_M(T_{2D}^{(\omega)}(r), \omega)]^2 \cdot dr$$

The transform $T_{2D}^{(\omega)}$ is then applied to all cross sections of $I_M(x)$ perpendicular to 'ω'. The moving image $I_M(x)$ is updated with the transformed moving image for a another projection direction. The process is repeated for all projection directions until the 2D estimated transform $T_{2D}(\omega)$ is close to an identity transform.

Figure 3:
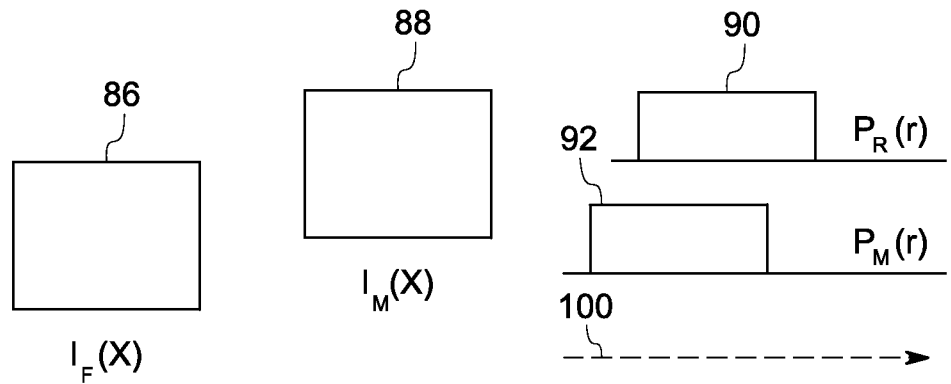
FIG. 3 is an example of estimating a one dimensional translation transform applied to a horizontal section of a two dimensional moving image.

FIG. 3 is simple diagrammatic examples illustrating for registering a two-dimensional fixed image $I_F(x)$ 86 and a moving image $I_M(x)$ 88. The vertical projections and estimated one-dimensional transform are applied in horizontal directions 100. The resulting 1D translation transforms $P_F(r)$ and $P_M(r)$ is shown by 90 and 92 respectively.

Figure 4:
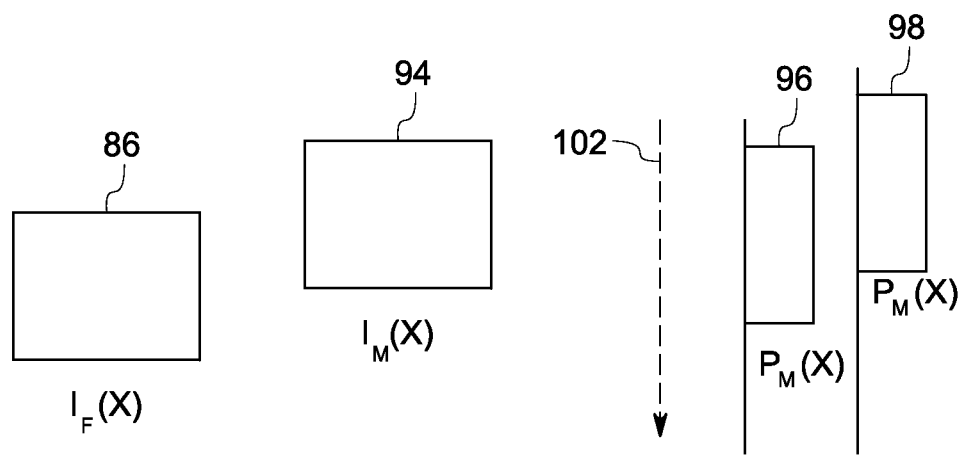
FIG. 4 is an example of estimating a one dimensional translation transform applied to a vertical section of a two dimensional moving image.

FIG. 4 is another diagrammatic example illustrating registering a two-dimensional fixed image $I_F(x)$ 86 and a moving image $I_M(x)$ 94. The horizontal projections and estimated one-dimensional transform are applied in vertical directions 102. The resulting 1D translation transforms $P_F(r)$ and $P_M(r)$ is shown by 96 and 98 respectively.

Images defined in $R^3$ and $R^2$ are treated as vector spaces. The cost function is therefore written as an inner product:

$$\varepsilon(T) = \|I_F(x) - I_M(T \cdot x)\|^2$$
$$= \langle I_F(x) - I_M(T \cdot x), I_F(x) - I_M(T \cdot x) \rangle_{3D}$$

where $\langle I_F(x) - I_M(T \circ x), I_F(x) - I_M(T \circ x) \rangle_{3D}$ is the inner product defined on a vector space of all 3-D images.

Since projection of a 3-D image into a 2-D image is a linear operator the cost function in the projection space is rewritten as:

$$\varepsilon(T) = \|P_\omega \cdot I_F(x) - P_\omega \cdot I_M(T_{\omega,2D} \cdot x)\|^2$$
$$= \|P_\omega \cdot I_F(x) - P_\omega \cdot I_M(T_{\omega,3D} \cdot x)\|^2$$
$$= \|P_\omega \cdot [I_F(x) - I_M(T_{\omega,3D} \cdot x)]\|^2$$

where transform $T_{\omega,3D}$ is the "backprojection" of the 2-D transform $T_{\omega,2D}$ along 'ω'. Thus, for each projection direction a 3-D registration problem is calculated with a transform constrained to the plane perpendicular to direction 'ω'.

The above-described invention has many advantages including higher accuracy and reduction in computational complexity. Specifically, by converting a 3-D registration technique into a set of 2-D registration techniques, the number of parameters is substantially reduced thereby resulting in reduced levels of computational complexity and a simpler structure of the cost function. Also, by converting a 3-D deformable registration problem into a set of 2-D problems, the number of parameters required for accurate motion modeling for each projection direction is reduced.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for registering two three-dimensional (3D) volumes, the method comprising;
   projecting the two 3D volumes in a plurality of two-dimensional (2D) spaces;
   estimating a plurality of two dimensional (2D) deformable fields for a corresponding 2D space;
   backprojecting the 2D deformation fields in a 3D space;
   updating a three dimensional (3D) deformable field, wherein updating the 3D deformable field comprises composition of backprojections of the 2D deformable fields in a plurality of projection directions.

2. The method of claim 1, wherein the step of estimating comprises applying a 2D deformable registration algorithm.

3. The method of claim 1, wherein the number of projection directions is based upon a complexity of the moving volume.

4. The method of claim 1, wherein the number of projection directions is based upon an amount of motion in the moving volume.

5. The method of claim 1, wherein estimating the 2D deformable fields comprises estimating the 2D deformable fields in a plane orthogonal to the projection directions.

6. The method of claim 1, wherein the step of acquiring backprojections comprises acquiring a first image at a first time and a second image at a second time.

7. The method of claim 6, further comprising:
generating a 3D deformation field of the first image and the second image; and
aligning the first image and the second image to compensate a displacement in the first image and second image.

8. The method of claim 1, wherein step of projecting and the step of backprojecting comprises using orthogonal projection, perspective projections or curved projections.

9. The method of claim 1, wherein the three-dimensional volumes are generated using at least one of a computed tomography (CT) system, a positron emission tomography (PET) system, a digital radiography system, an ultrasound imaging system, single photon emission computed tomography (SPECT) or a magnetic resonance imaging (MRI) system.

10. An imaging system for registering two three-dimensional (3D) volumes, the system comprising;
a processor configured to implement an imaging algorithm, wherein the imaging algorithm is configured to:
project the two 3D volumes in a plurality of two-dimensional (2D) spaces;
estimate a plurality of two dimensional (2D) deformable fields for a corresponding 2D space;
backproject the 2D deformation fields in a 3D space; and
update a three dimensional (3D) deformable field, wherein updating the 3D deformable field comprises composition of backprojections of the 2D deformable fields in a plurality of projection directions.

11. The system of claim 10, wherein the imaging algorithm is configured to apply a 2D deformable registration algorithm for estimating the plurality of 2D deformable fields.

12. The system of claim 10, wherein the number of projection directions is based upon a complexity of the moving volume.

13. The system of claim 10, wherein the number of projection directions is based upon an amount of motion in the moving volume.

14. The system of claim 10, wherein imaging algorithm is configured to estimate the 2D deformable fields in a plane orthogonal to the projection directions.

15. The system of claim 11, wherein the imaging algorithm is configured to acquire a first image at a first time and a second image at a second time.

16. The system of claim 15, wherein the imaging algorithm is further configured to generate a 3D deformation field of the first image and the second image and align the first image and the second image to compensate a displacement in the first image and second image.

17. The system of claim 11, wherein the three-dimensional volumes are generated using at least one of a computed tomography (CT) system, a positron emission tomography (PET) system, a digital radiography system, an ultrasound imaging system, single photon emission computed tomography (SPECT) or a magnetic resonance imaging (MRI) system.

18. The system of claim 10, wherein the processor is configured to use orthogonal projection, perspective projections or curved projections.

* * * * *